United States Patent
Renner et al.

(10) Patent No.: US 12,480,286 B2
(45) Date of Patent: Nov. 25, 2025

(54) METHOD FOR MONITORING AND/OR PERFORMING A MOVEMENT OF AN ITEM OF MACHINERY, AND ITEM OF MACHINERY AND COMPUTER PROGRAM PRODUCT

(71) Applicant: Liebherr-France SAS, Colmar (FR)

(72) Inventors: Anton Renner, Stuttgart (DE); Hannes Wind, Stuttgart (DE); Oliver Sawodny, Stuttgart (DE)

(73) Assignee: LIEBHERR-FRANCE SAS, Colmar (FR)

( * ) Notice: Subject to any disclaimer, the term of this patent is extended or adjusted under 35 U.S.C. 154(b) by 342 days.

(21) Appl. No.: 17/815,472

(22) Filed: Jul. 27, 2022

(65) Prior Publication Data
US 2023/0034265 A1  Feb. 2, 2023

(30) Foreign Application Priority Data
Jul. 27, 2021  (DE) .................. 10 2021 119 455.5

(51) Int. Cl.
*E02F 9/26* (2006.01)
*E02F 3/43* (2006.01)
*E02F 9/20* (2006.01)

(52) U.S. Cl.
CPC .............. *E02F 9/264* (2013.01); *E02F 3/437* (2013.01); *E02F 9/2029* (2013.01)

(58) Field of Classification Search
CPC ......... B66C 13/48; B66C 23/90; B66C 15/06; B66C 13/18; B66C 23/54; E02F 9/24;
(Continued)

(56) References Cited

U.S. PATENT DOCUMENTS

| 5,461,803 A | 10/1995 | Rocke |
| 11,346,084 B2 | 5/2022 | Nishimura |

(Continued)

FOREIGN PATENT DOCUMENTS

| DE | 19510376 A1 | 9/1995 |
| DE | 102011002712 A1 | 7/2012 |

(Continued)

*Primary Examiner* — Khoi H Tran
*Assistant Examiner* — Alyse Tramanh Tran
(74) *Attorney, Agent, or Firm* — McCoy Russell LLP

(57) ABSTRACT

The disclosure relates to a method for monitoring and/or performing a movement of an item of machinery wherein the item of machinery comprises a movement device with a tool for picking up material, which comprises at least two components, each of which is movable via at least one actuator, and a control system by means of which the actuators of the movement device can be actuated by way of open-loop and/or closed-loop control. The method according to the disclosure comprises (i) detecting status information of at least two components, (ii) calculating torques that are applied to components, (iii) detecting torques actually applied to components, (iv) comparing the calculated and detected torques and determining a force vector actually applied, and (v) executing an action depending on the calculated force vector. The disclosure also relates to an item of machinery and a computer program product for executing the method.

19 Claims, 2 Drawing Sheets

(58) Field of Classification Search
CPC . E02F 9/264; E02F 9/262; E02F 9/267; E02F 9/265; E02F 9/2033; E02F 9/268; E02F 3/437; E02F 9/2029; B60W 2420/403; B60W 2556/40; B60W 2552/53
See application file for complete search history.

(56) References Cited

U.S. PATENT DOCUMENTS

| | | |
|---|---|---|
| 11,427,984 B2* | 8/2022 | Roh ................. E02F 9/264 |
| 2002/0075157 A1 | 6/2002 | Muller |
| 2009/0187527 A1* | 7/2009 | Mcaree ............. G01G 19/08 |
| | | 702/174 |
| 2014/0163779 A1* | 6/2014 | Braunstein ......... G05D 1/021 |
| | | 701/25 |
| 2020/0157775 A1 | 5/2020 | Sawodny et al. |
| 2021/0054595 A1* | 2/2021 | Sano ................. E02F 9/2292 |

FOREIGN PATENT DOCUMENTS

| | | | |
|---|---|---|---|
| DE | 112018002269 T5 | 2/2020 | |
| DE | 102018126809 A1 | 4/2020 | |
| EP | 2843378 A1 | 3/2015 | |
| EP | 3351689 A1 * | 7/2018 | ............. E02F 3/28 |
| JP | 2007178362 A | 7/2007 | |

\* cited by examiner

METHOD FOR MONITORING AND/OR PERFORMING A MOVEMENT OF AN ITEM OF MACHINERY, AND ITEM OF MACHINERY AND COMPUTER PROGRAM PRODUCT

CROSS-REFERENCE TO RELATED APPLICATION

The present application claims priority to German Patent Application No. 10 2021 119 455.5 filed on Jul. 27, 2021. The entire contents of the above-listed application is hereby incorporated by reference for all purposes.

TECHNICAL FIELD

The present disclosure relates to a method for monitoring and/or performing a movement of an item of machinery, to an item of machinery which is configured to perform the method according to the disclosure, and to a computer program product.

BACKGROUND

When performing excavation work or digging processes with the help of excavators, forces arise that are applied to the tool (e.g. excavator bucket). The excavator must overcome these forces in order to continue the digging process. If digging is too deep or if there is an obstacle on the digging trajectory, it may no longer be possible to overcome the forces that occur. The same applies to other earth excavation machinery or material handling machinery having a tool for picking up or gripping material and which may also encounter obstacles. The underlying problem is described below with reference to excavators performing excavation work, wherein the following explanations apply analogously to other earth excavation or material handling machinery.

SUMMARY

Traditionally, an excavator is controlled manually and the operator must independently assess the condition of the machine and the digging process. In manual operation of the excavator, feedback can be given to the operator regarding the forces acting during the digging process.

For some years now, automation of excavator operation has increasingly been taking place, for example via assistance functions such as tool-centre-point control, which assist the driver but do not fully automate the process. For autonomous or semi-autonomous operation of the excavator, it is necessary to adaptively adjust the planned digging trajectory on the basis of the acting forces and the forces that can be applied by the excavator in order to thus guarantee smooth operation. For automated operation, it is therefore necessary to consider the (digging) forces that occur during the digging process in order to be able to react to the particular environmental influences and to avoid deviations in the movement sequence or even damage.

The object of the present disclosure is therefore to allow or improve the automation of such work operations of earth excavation or material handling machinery.

Therefore, according to one aspect of the present disclosure, a method is provided for monitoring and/or performing a movement of an item of machinery, such as an item of material handling or earth moving machinery and in particular an excavator, wherein the item of machinery has a movement device with a tool for picking up material, which comprises at least two components, each of which is movable via at least one actuator. Furthermore, the item of machinery comprises a control system by means of which the actuators of the movement device can be controlled by way of open-loop and/or closed-loop control.

DETAILED DESCRIPTION

Figure 1:
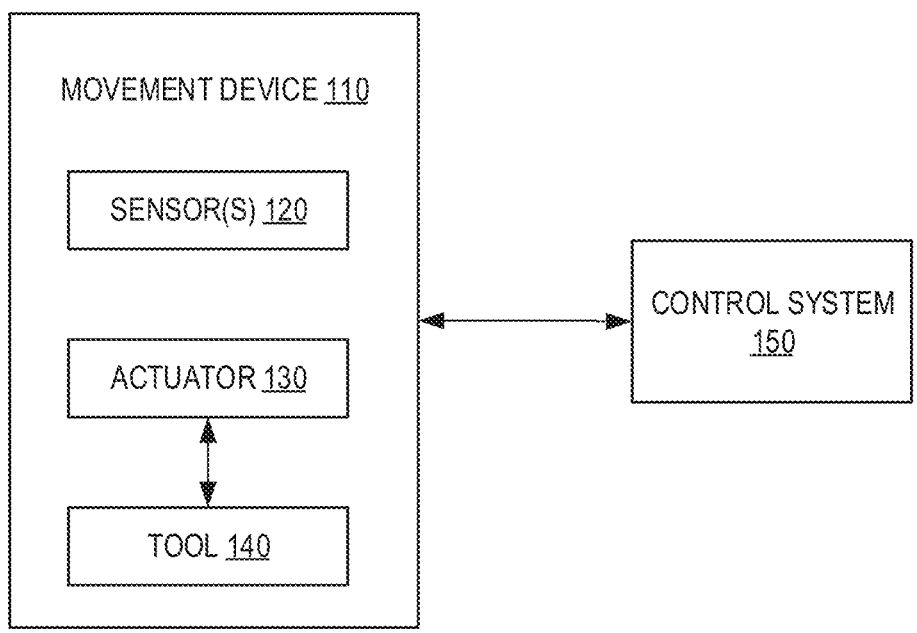
FIG. 1 shows a schematic drawing of an embodiment of the movement device and control system.
Figure 2:
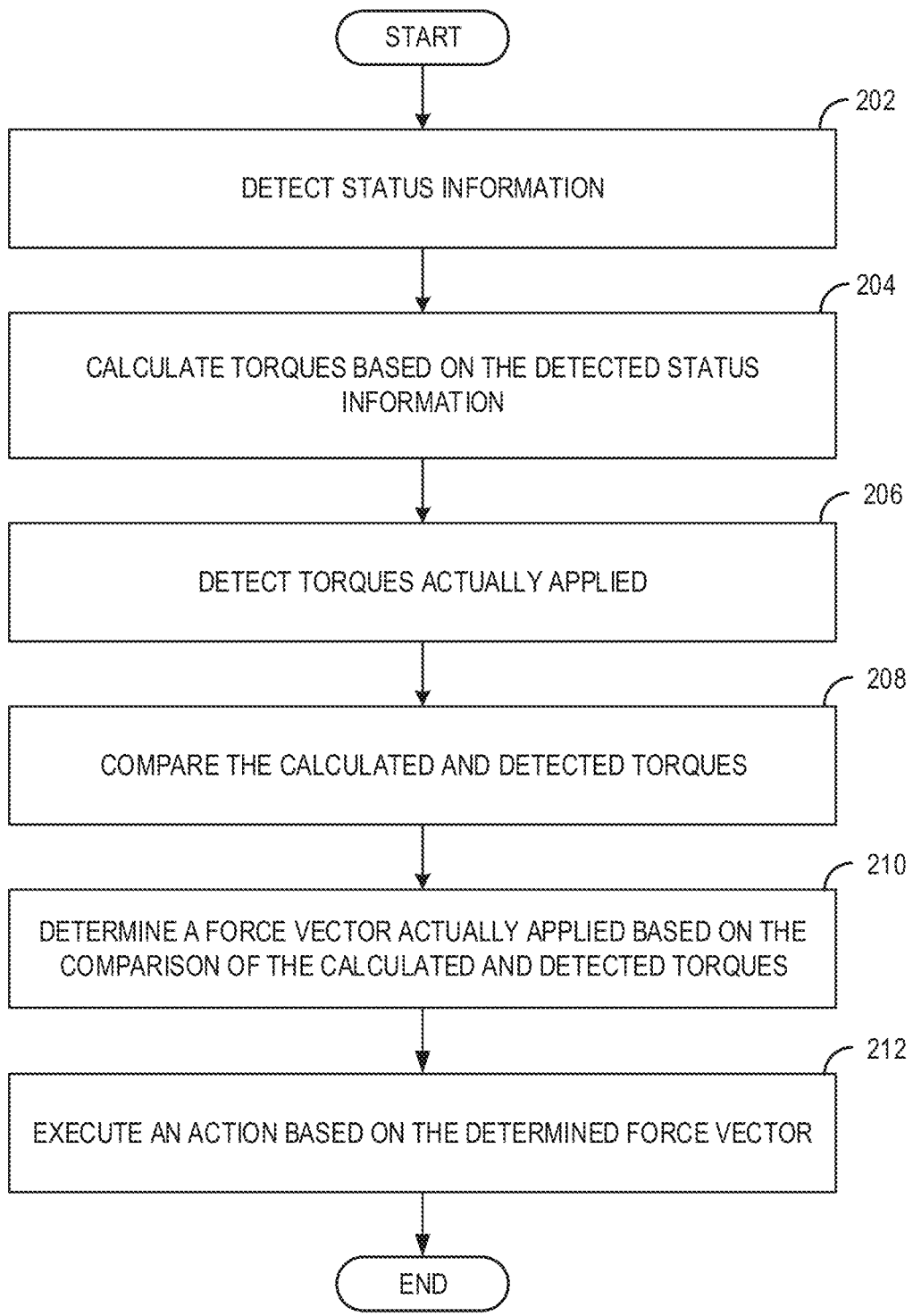
FIG. 2 shows a flowchart of an example method for monitoring and/or performing a movement of an item of machinery.

The movement device 110 can be a boom, in particular an excavator boom. The tool 140 can be, for example, an excavator bucket or clamshell grab. The tool 140 can be regarded as one of said at least two components of the movement device 110, although this does not necessarily have to be the case. Of course, more than two components can be provided, each with associated actuators 130, one of which components may be the tool 140. The other components may be, for example, a boom and an arm. The actuators 130 may be hydraulic cylinders and/or motors (for example a slewing gear motor). A superstructure or slewing gear of the item of machinery may also be one of the components of the movement device 110.

The method according to the disclosure comprises the following steps:

1) at 202, detecting status information concerning at least one current position and/or a current speed and/or a current acceleration of at least two components of the movement device 110,
2) at 204, calculating torques that are applied to components due to a current configuration of the item of machinery (i.e. model-based or theoretical torques), wherein the aforementioned status information and component information of the components are taken into account for this purpose,
3) at 206, detecting torques actually applied to components,
4) at 208, comparing the torques calculated in step 2) and the torques detected in step 3) and, at 210, determining a force vector actually applied at a defined application point of the item of machinery on the basis of said comparison, and
5) at 212, executing an action depending on the force vector calculated in step 4).

These steps do not necessarily all have to be performed in succession or in the stated order.

When referring herein to a detection of a torque, this also includes the case in which the actual measurement concerns another variable (e.g. a pressure or a force) and a suitable conversion into a torque takes place (e.g. a measured force can be converted into a torque via the cross product with a position vector, wherein the position vector can be known as component information or as information derived therefrom).

The method according to the disclosure takes into account the forces actually acting on the movement device 110 during the performance of a work operation in the form of a force vector, which is related to a defined application point. The latter can ideally be fixed and may be located on the tool 140 or an end effector. In the case of an excavator performing a digging process, said calculated force vector is in particular a digging force that is actually applied presently.

The calculation in step 2) of the theoretical torques and the detection in step 3) of the torques actually acting refer in particular to the same components, so that a direct comparison can take place and conclusions can be drawn from this about a force vector actually applied. In order to characterise the latter as accurately as possible, the torques of at least two different components must be compared with each other so that at least two components of the force vector that are not parallel to each other can be determined. The more components of the movement device 110 that are included in the comparison, the more precisely the force vector can be determined.

However, in principle, even with components (or the associated position vectors) oriented parallel to each other, a sufficient estimation of the force actually applied could function, since the non-observed force component would be absorbed by the structure of the item of machinery and the actuators 130 would therefore only have to overcome the observable portion of the force vector (or rather the portion determinable by the stated comparison).

The term "comparison" is to be interpreted broadly. Said comparison may therefore include any method which makes it possible to determine or estimate the force actually applied from the calculated torques and the determined torques. Thus, the comparison may include a determination of the force actually applied by means of the method of least squares of error, or another estimation method, in particular a recursive estimation method, may be used.

Taking the digging force into account allows the digging process to be automated, for example by adjusting a planned trajectory for a movement within the scope of the digging process (i.e. a digging trajectory) accordingly to the digging force and/or by issuing an alert to the operator of the item of machinery if a limit value is exceeded. An adjustment can be implemented, for example, in the form of a rescheduling of the digging trajectory or a termination of the digging process.

The adjustment of the digging trajectory and the issuance of an alert are merely examples of the stated action, which is executed depending on the calculated force vector. Of course, other actions are conceivable here, such as an adjustment of machine parameters. In addition, an adjustment of the digging trajectory can, for example, depend on further conditions, such as the exceedance of a time threshold value and/or the exceedance of a trajectory error limit value.

The method according to the disclosure can be used, however, not only in digging processes, but generally in all work sequences in which external forces act on the tool 140 (or the movement device 110) of the item of machinery, which may require a consideration such as an adjustment of a predefined trajectory in the context of automatic movement sequences. Such a work sequence can be, for example, the picking up of material with the gripping tool of an item of material handling machinery. Here, for example, the jamming of material to be moved could lead to the occurrence of increased forces, which must be taken into account for an automatic handling process. In this context, external forces are also understood in particular to be all forces that can occur due to the work sequence of the item of machinery, for example when digging, lifting or moving material, picking up material, etc.

In one possible embodiment, it is provided that the component information concerns a mass, a moment of inertia and/or a centre of gravity of the particular components. Ideally, geometric information or dimensions of the components are provided as component information. Data-driven models would also be conceivable here, which only require the status information and torque measurements. The component information is needed to determine model-based torques which—without taking into account external forces or forces arising from the work process—act on the individual components solely on the basis of the configuration (or the set-up state) and the current position of the item of machinery or the movement device 110.

The component information can be stored on a memory of the item of machinery, which can, for example, be part of the control system 150 or an external module connected to the control system 150. The component information can also be stored in an external computer unit, such as a cloud, which is connected communicatively to the control system 150, in particular wirelessly, and can be called up by the control system 150. Alternatively or additionally, the component information can be generated by a modelling means of the control system 150 on the basis of a static or dynamic model of the item of machinery or the movement device 110.

In another possible embodiment, it is provided that the defined application point is located at the tool 140, in particular at an end effector (i.e. at the tool centre point or TCP) of the movement device 11. The application point can be fixable or variable, e.g. by the operator of the item of machinery.

In another possible embodiment it is provided that the calculated (model-based or theoretical) and the detected (actual) torques are each related to the same reference points of the movement device 110. This makes it possible to conclude that an additionally acting external force, such as a digging force, is effective by comparing the torques predicted solely on the basis of the configuration and position of the movement device 110 and the torques actually measured. The reference points can be joints or rotary joints of the movement device 110, via which the components are rotatably connected to each other (or to the tool 140, wherein the latter cart also be regarded as a component of the movement device lit)).

The joints of the components of the movement device 110 forming a kinematic chain define, in particular, position vectors which are used to characterise the current positions or movements of the components and to calculate the torques. For example, a boom articulated to a superstructure of the item of machinery via a first joint and pivotably connected to an arm via a second joint can thus be represented by a position vector running from the first to the second joint. A torque acting on the boom at the location of the first joint is then the cross product of said position vector and a force acting on the boom at the location of the second joint. The same applies to the other components interconnected in articulated fashion, such as the arm, tool, etc.

According to the example described above, in another possible embodiment is provided that the reference points for the calculated torques, starting from a joint of a component on a superstructure of the item of machinery, define position vectors which are not parallel to each other when the torques are detected. The torque at a rotary joint due to the external force (e.g. digging force) is the cross product of the position vector and said force. Thus, only the portion of the force vector orthogonal to the position vector has an influence on the torque. Therefore, at least two torque measurements are needed to estimate the force vector in the plane of which the position vectors do not run parallel to each other.

In another possible embodiment, it is provided that the status information is detected by means of sensors 120 arranged on the movement device 110. Here, for example, a combination of position and/or speed and/or acceleration sensors can be provided.

The item of machinery may generally comprise a set of sensors 120 to detect different variables.

For example, the item of machinery can have at least one pressure sensor for measuring a hydraulic pressure applied to an actuator 130. The movement device 110 can have one or more hydraulic cylinders as actuators 130 to move the individual components. In some embodiments, at least one pressure sensor is provided per hydraulic cylinder and in each case measures the prevailing or applied hydraulic pressure. Ideally, two pressure sensors are used per hydraulic cylinder, wherein both the rod side and the base side of each hydraulic cylinder are each equipped with a pressure sensor. The force acting on the actuator 130 can be calculated via the pressure determined in this way and lastly can be defined as a vector via the known spatial position of the actuator 130 or hydraulic cylinder. The force vectors of the actuators 130 calculated from the geometric actuator parameters and the detected pressures are also referred to here as pressure vectors for simplification.

From the pressure vector of an actuator 130, a force acting on one of the joints of the component and thus the corresponding torque can be calculated, taking into account the corresponding component information of the component movable by the actuator and its current position or stance. The component information of the movement device 110 may also include information relating to the various actuators 130, such as the articulation points of the cylinder and rod on the various components, the piston areas, friction values, the masses of the actuators, etc., in order to be able to determine the corresponding forces from the pressure measurements.

Alternatively or additionally, the item of machinery can comprise at least one torque transducer for measuring an applied torque. It is conceivable that at least one torque transducer is provided per actuator 130 in order to detect the torques acting on each of the various components.

Alternatively or additionally, the item of machinery can comprise at least one angle sensor for measuring a current angle of a component. The measured angle can be the angle of a component relative to another component, to a superstructure of the item of machinery, or to the tool 140. The angle sensor is ideally located in the region of a rotary joint of a component. In certain embodiments, one angle sensor is provided per rotary joint in order to fully detect the positions of the individual components of the kinematic chain. Alternatively or additionally, at least one sensor can be provided which measures the extension length of at least one hydraulic cylinder. Due to the fixed geometry of the movable component, this has as a result the corresponding angular position.

Alternatively or additionally, the item of machinery may have at least one position sensor for measuring a current position of a component. The detected position can be an absolute position, which is measured, for example, by means of a GPS module or a GNSS antenna (including receiver) attached to the corresponding component. A GPS module/GNSS antenna can also be provided elsewhere on the item of machinery, such as on a superstructure, for example in order to detect a position of the item of machinery. An estimate of the orientation and position of the item of machinery can also be made using a combination of GNSS antennas and IMUs (e.g. an IMU can be installed on a superstructure of the item of machinery for this purpose). This may make it possible to incorporate terrain information, which may be useful, for example, for autonomous operation of the item of machinery and/or for anti-tilt protection. For example, in the event of excessive digging forces, intelligent trajectories could be generated to continue an autonomous digging process.

Alternatively, or additionally, the item of machinery can have at least one inertial sensor for measuring a current speed and/or acceleration of a component, for example an acceleration sensor and/or a rotation rate sensor. The inertial sensor can be an inertial measurement unit (T U). In some embodiments, an inertial sensor or IMU is provided on a plurality of components, in particular on each component of the movement device 110 used to detect the force actually in effect, i.e. in the case of an excavator boom in particular on the boom and on the arm as well as possibly on the tool 140. In order to determine the position of the item of machinery, an IMU can also be installed on a rotatable superstructure of the item of machinery.

Alternatively, or additionally, the item of machinery can have at least one sensor for detecting a current fill level and/or fill weight of the tool 140. This makes it possible, for example, to detect a current filling of an excavator bucket. It can be provided that, when a maximum fill quantity is reached, a current, automatic digging process is terminated, for example in order to empty the bucket at a specific unloading position. Alternatively, the fill weight could be determined by a suitable algorithm that uses information from various sources such as position and orientation estimation, terrain information, trajectory travelled, etc.

Alternatively, or additionally, the item of machinery can have at least one acoustic sensor for detecting a noise of the item of machinery during operation, the signals of said sensor being evaluated by means of an analysis means in order to conclude a current operating state of the item of machinery, such as the reaching of a performance limit. A machine learning method or artificial neural network can be used to analyse the sensor signals in order to reliably identify different machine states on the basis of the recorded noises and, if necessary, to execute corresponding actions.

In another possible embodiment it is provided that the force vector actually applied is determined by means of a recursive method, for example a recursive least squares algorithm, or by means of an observer such as a Kalman filter.

Alternatively, or additionally, it can be provided that the force vector actually applied is multiplied by a weighting factor. In this way, uncertainties in the model on which the determination of the theoretical torques is based can be taken into account and thus a maximum load limit of the movement device 110 can be reliably observed. The weighting factor can depend on a current state of the movement device 110 or the item of machinery or on the determined force vector actually applied.

In a further possible embodiment it is provided that the action executed comprises the issuance of a warning or an alert, in particular visually and/or acoustically. In this way, for example, the operator of the item of machinery can be informed that a maximum force (e.g. digging force) has been exceeded, a maximum filling of the tool 140 has been reached, a safety range with regard to the tilt resistance of the item of machinery has been exceeded, or a trajectory has been adjusted. Furthermore, it can be provided that a message or a signal is sent to an external device or a cloud.

In another possible embodiment, it is provided that the control system 150 is configured to automatically actuate the actuators 130 in such a way that the tool 140 moves along a trajectory. The control system 150 is thus configured for autonomous or semi-autonomous control of the item of machinery and can perform movements along predefined trajectories. The action depending on the calculated force vector can include a change of the trajectory and/or an intervention in the automatic movement along the trajectory.

The trajectory can be a digging trajectory, i.e. a predefined trajectory along which the tool 140 moves during a digging process. The work operation can be divided into a plurality of work steps or phases, wherein one or more trajectories can be predefined for each of the phases.

For example, an automatically performed digging process can be divided into three phases, wherein a first phase concerns the actual digging, in which material is picked up using an excavator bucket and the digging forces that occur here are taken into account by means of the method according to the disclosure, a second phase concerns the unloading of the material, for example on a lorry, and in a third phase the excavator bucket is moved from the unloading point to the next digging position, Of course, a subdivision into more or fewer phases is possible with one or more trajectories per phase.

The method according to the disclosure can be used here not only during the digging itself, but also in the other phases. For example, during unloading, a force may also act on the tool 140 or the movement device 110, which may lead to an adjustment of the trajectory if taken into account accordingly.

In a further possible embodiment, it is provided that the determined force vector is compared with at least one comparison force vector and the action is executed on the basis of the stated comparison, wherein the at least one comparison force vector may correspond to a maximum possible force (e.g. a maximum possible digging force). If, for example, the amount of the determined force vector exceeds the amount of the comparison force vector, an adjustment or recalculation of a trajectory or even a termination of the current work process can be implemented. The issuance of a message is also conceivable.

The comparison force vector can be stored on a memory or calculated by a modelling means during the work process on the basis of a static or dynamic model taking into account a current position of the item of machinery or the movement device 110.

In another possible embodiment, it is provided that at least one force vector calculated on the basis of a maximum possible pressure at an actuator 130 is projected onto a reference vector in order to obtain the comparison force vector. For each actuator 130 of the movement device 110, a corresponding force vector can be determined and projected onto the reference vector, so that a plurality of comparison force vectors are calculated. For each of these comparison force vectors, a comparison can be made with the force actually applied and, if necessary, a specific action can be performed.

The reference vector can be the determined force vector that is actually applied, a speed vector that represents a trajectory travelled by the movement device 110, or a vector definable or defined in some other way. If the reference vector does not correspond to the determined force vector that is actually applied, the latter may also be projected onto the reference vector so that the projections of the force vectors determined from the actuator pressures and the projection of the force vector that is actually applied can be meaningfully compared with each other.

In order to obtain the force vectors for comparison with the determined force actually applied, it may be necessary to convert force or pressure vectors applicable for the individual actuators 130 into corresponding force vectors related to specific reference points of the components movable by the actuators 130, for example to rotary joints or to a reference point on the tool 140 or end effector. Since the components are structurally fixed, a conversion of the pressure or force vectors into the force vectors at the one or more reference points is possible by means of the available component information.

In another possible embodiment it is provided that the action is executed when the absolute value of the determined force vector exceeds the absolute value of the comparison force vector and/or a trajectory error exceeds a limit value. These criteria can thus individually or in combination lead to the performance of an action, such as an adjustment or recalculation of the trajectory, the issuance of an alert or the termination of the current work operation. Of course, other criteria can be used. These can either be fixed or dependent on a current position of the item of machinery and/or environmental impacts.

In another possible embodiment, it is provided that the trajectory is travelled at a reference speed, wherein the action comprises a reduction of the reference speed. The reduction can either be to a lower reference speed, or to a speed of zero in order to end the current work operation. The reduction can take place in steps, i.e. first the reference speed is reduced to a lower value and then the force actually applied determined again in a subsequent step is compared again with the comparison force vector. If this value is exceeded again, the reference speed can either be reduced to a lower value or the current work operation can be stopped directly or terminated in a controlled manner.

In another possible embodiment, it is provided that the action comprises a termination of the automatic movement along the trajectory, wherein a position of the tool 140 may reach so far, in particular a maximum depth and/or distance of the tool 140 from a superstructure of the item of machinery, is detected and stored in the control system 150 (or a memory connected to the control system 150). These values can be used when planning the next work operation. In other words, when continuing the trajectory this may be planned and/or performed starting from the above-mentioned stored position.

In a further possible embodiment, it is provided that a parameter representing the tilting behaviour of the item of machinery is concluded on the basis of the determined force vector actually applied and a current position of the item of machinery or the movement device 110, wherein said action may be performed if the parameter exceeds or falls below a limit value. For example, a digging force determined by the method according to the disclosure can be used to monitor the tilting behaviour of the item of machinery. For example, if a safety range with respect to tilt resistance is exceeded, an automatic work operation can be aborted and the item of machinery can be set to a safe state. This can also concern, for example, the mere moving or setting down of a load or material. For the analysis or monitoring of the tilting behaviour of the item of machinery, the orientation or position of the item of machinery can be determined, for example via an IMU installed on a superstructure of the item of machinery.

In another possible embodiment, it is provided that the movement device 110 is an excavator boom, wherein a first component is a boom articulated to a superstructure of the item of machinery and a second component is an arm articulated to the first component. For instance, a third component is the tool 140 itself. The tool 140 can be articulated to the arm directly or via one or more further components. The various components of the excavator boom may be connected to each other via hydraulic cylinders and can be pivoted relative to each other. One of the components of the movement device 110 can be the slewing gear of said superstructure. This can be the first link of a kinematic chain formed by the movement device 110. Alternatively, the boom articulated to the superstructure can be the first link of the kinematic chain.

Not all movable components of the excavator boom need necessarily be considered components of the movement device 110 within the meaning of the present disclosure. For example, the excavator boom can have one or more deflection levers for moving an excavator bucket, to which a bucket cylinder is articulated. However, it is not necessary to calculate individual model-based torques for such deflection levers or to detect torques that are actually applied. The kinematic chain of such an excavator arm is defined in particular by the rotary joint between the excavator bucket and the arm or the boom component connected to the excavator bucket.

The calculations and/or control commands can refer to actuator coordinates or Cartesian coordinates (e.g. TCP coordinates or world coordinates). However, the choice of the exact coordinate system does not affect the subject matter of the disclosure. If necessary, the various coordinate systems can be readily converted into each other by appropriate transformations.

The present disclosure further relates to an item of machinery, such as an item of material handling or earth moving machinery and in particular an excavator, comprising a movement device 110 with a tool 140 for picking up material, which comprises at least two components each movable via at least one actuator 130, and a control system 150 by means of which the actuators 130 can be controlled by way of open-loop and/or closed-loop control.

The item of machinery is configured to perform the method according to the disclosure, i.e. it has corresponding means for performing the method steps according to the disclosure. The item of machinery can be designed in accordance with one or more of the embodiments described above, which have been discussed within the scope of the method according to the disclosure. Obviously, the same properties result as for the method according to the disclosure, and therefore a repetitive description is spared at this juncture.

It is conceivable here that the respective method steps, in particular steps 2), 4) and 5) described above, can be performed by the control system 150 or wholly or partially by means connected to the control system 150. Some of the method steps can be performed outside the item of machinery, for example by an external computer unit or cloud, and the corresponding data can be transmitted to the item of machinery. It is also conceivable that a separate electronic module or a separate computer unit is available on the item of machinery for performing certain method steps, such as estimating the digging force.

In one possible embodiment it is provided that the item of machinery comprises a superstructure rotatably mounted on a mobile undercarriage, wherein the movement device 110 is an excavator boom, wherein a first component is a boom articulated to the superstructure and a second component is an arm articulated to the first component. For instance, a third component is the tool 140 itself. The tool 140 can be articulated to the arm directly or via one or more other components. The various components of the excavator boom may be connected to each other via hydraulic cylinders and can be pivoted relative to each other.

The present disclosure further relates to a computer program product comprising commands which, when the program is executed, cause the item of machinery according to the disclosure to execute the steps of the method according to the disclosure. The method steps can all be executed using means of the item of machinery. Alternatively, it is conceivable that one or more steps are outsourced and performed by a (computer) unit connected to the item of machinery, wherein a corresponding exchange of data occurs. The latter feature is also understood here to mean that the corresponding steps are executed by the item of machinery, since the item of machinery at least provides the data required to execute these steps and/or receives the externally generated data in order to execute a corresponding action if necessary.

It may be provided that all steps requiring calculation, modelling, comparison or other data processing are performed by the control system 150 of the item of machinery itself. However, one or more of these steps can be performed by external modules or computers connected to the control system 150.

Further features and details of the disclosure will become apparent from the exemplary embodiments explained below.

To illustrate the method according to the disclosure, the example of a hydraulic excavator with a superstructure rotatable by means of a slewing gear and an excavator boom articulated thereto as the movement device 110 will be assumed in the following. The excavator boom comprises a boom articulated to the superstructure so as to be pivotable about a rotary joint, an arm or bucket arm connected to the other end of the boom so as to be pivotable about a further rotary joint, and, as a tool, an excavator bucket connected to the other end of the arm so as to be pivotable about a further rotary joint.

The boom, arm and excavator bucket can each be moved or pivoted by means of at least one hydraulic cylinder, while at least one hydraulic motor drives the slewing gear of the superstructure. Each of the movable components (superstructure, boom, arm and excavator bucket) is thus assigned at least one actuator 130 (slewing gear, hydraulic cylinder). For example, an extension of one or two boom cylinders arranged between the superstructure and the boom causes the boom to pivot about the rotary joint on the superstructure so that its end spaced from the superstructure moves upwards. An arm cylinder articulated to the boom and the arm pivots the arm relative to the boom. Furthermore, a bucket cylinder is provided, which pivots the excavator bucket relative to the arm, possibly via one or more deflection levers. An energy recovery cylinder can also be provided between the superstructure and the boom. In this case, the influence of the energy recovery cylinder (e.g., the force exerted by the latter during a boom movement for support) must also be taken into account for the kinematic model of the item of machinery.

The various components can be moved independently of each other by means of the different actuators 130 and can form a kinematic chain. For the following consideration, it is not relevant whether the superstructure itself is considered a component of the movement device 110 (the centre of gravity and the mass of the superstructure are, however, relevant for the question of tilt avoidance).

The item of machinery comprises a control system 150 that controls the individual actuators 130 and thus controls the movement of the item of machinery. The overall movement of the item of machinery is composed here of the individual movements of the components moved by the various actuators 130. The control system 150 is configured to move the item of machinery or the excavator arm automatically. For example, the control system 150 is able to perform an autonomous digging process in which earth material, for example, is dug out in several successive and coordinated steps and is deposited at a dumping position.

The number of movable components, their exact configuration and the type and number of associated actuators 130 are presented here merely as examples. However, the method according to the disclosure functions independently of the exact number and configuration of the components and actuators 130, in particular also with a larger number of components or degrees of freedom of movement. Likewise, the work process does not have to be a digging operation and the item of machinery does not have to be a hydraulic excavator.

In the following section, possible algorithms for automatic digging using the method according to the disclosure on a hydraulic excavator will now be described. These include, among other things, the determination of the current digging force, static and dynamic models of the excavator, as well as trajectory generation methods for time indexing of a reference path.

Based on a current terrain model and a target profile, the necessary work steps are planned. The result of this work planning are the individual work steps, which include, among other things, the position of the excavator, the site paths for excavating material and the site paths for unloading the material (for example onto a lorry).

For automated digging, these individual work steps are linked one after the other and time-indexed with the help of a suitable trajectory generation method. These reference trajectories can be planned in, among other things, Cartesian coordinates or the joint or actuator coordinates. If the trajectories are planned in Cartesian coordinates, a suitable algorithm is used to transform them into joint or actuator coordinates. The actual control is usually performed in the coordinates of the actuators 130. The task of actuator control is to ensure that the measured states of the actuators 130 follow the reference states with low errors. Reference states can be here, among other things, the position or the speed of an actuator 130.

Based on the work planning and the site paths specified with it, a time indexing of these paths is performed for the automated digging. A distinction is made here between three phases. The first phase concerns the actual digging, in which material is picked up with the bucket or excavator bucket (alternatively, another tool such as a clamshell bucket or orange peel grab could be used), The second phase concerns the unloading of the material, for example onto a lorry. In the third phase the excavator is moved from the unloading point to the next digging position.

When digging in soil, it is possible that the actuators 130 cannot apply sufficient force to overcome the digging forces acting on the tool 140 (e.g. bucket). If this is the case, the movement comes to a standstill. In the case of a manual movement, the operator detects this and initiates new steps. For an automated digging process, this case must be taken into account in the trajectory generation. If this were not the case, significant trajectory errors would result.

Various approaches are conceivable for taking the digging forces into account during the digging process. One possibility is to take into account the current digging forces in conjunction with the maximum possible digging force and to incorporate these into the trajectory generation. A specific example for determining the current digging force according to the present disclosure is described below.

For the calculation of the maximum possible digging force, depending on the current position of the excavator and a static or dynamic model, a combination of different pressure vectors of the individual actuators 130 are used to calculate a model-based digging force.

This matrix of different force vectors on the tool 140 is then projected. Among other things, the current digging force (filtered if necessary), the current speed (filtered if necessary), the reference direction or various heuristic vectors can be used as projection vectors. In addition, the current digging force vector is projected onto this vector. To account for uncertainties in the model, a factor is introduced which is multiplied by the projected maximum possible digging force.

The trajectory is now re planned on the basis of various criteria. These criteria can be:
  a current projected digging force exceeds maximum possible projected digging force and in addition the trajectory error exceeds a limit value;
  the trajectory error exceeds a limit value.

If one of these criteria is met, the reference speed of the trajectory is reduced in a first step. This reduction takes place in steps depending on further criteria such as the exceedance of a time threshold. If this measure falls below one of the above-mentioned criteria again, the reference speed is increased again depending on criteria such as the exceedance of a time threshold. However, if the above criteria are active for another time threshold value, a further reduction of the reference speed to an even lower value or to zero is planned. If other criteria are fulfilled, the digging process is terminated and the material is unloaded. Among other things, the maximum depth reached and/or the position of the tool 140 in the longitudinal axis are stored and used in the planning of the next digging operation. Thus, the further planning of the trajectory is adaptive to previous digging operations and the reached positions of the tool 140.

Other aspects for re-planning a digging trajectory can be environmental influences. For example, sensor configurations can be used to detect the environment and to plan depending on the current terrain. This can also be done again after each digging operation. Additionally, these or other sensors can be used during the digging process to detect, for example, the current filling of the bucket and thus realise a re-planning of the trajectory. This re-planning can, for example, end the current digging process when the bucket has reached the maximum fill quantity.

Further sensors for determining machine states can be, for example, acoustic sensors. These can use suitable evaluation mechanisms to signal, for example, that the power limit and thus the maximum possible digging force has been reached. Machine learning methods, among other things, can be used here.

The estimated digging force can also be used for an evaluation of the tilt resistance. This can also be implemented in the automated digging process. In this case, for example, the automatic digging process can be aborted if a safety range is exceeded with regard to tilt resistance and the item of machinery can be set to a safe state. A safe state can, among other things, be dependent on the current position and the digging process and can, for example, result in a stop of the complete movement.

In the second phase, the trajectory is planned from the last position during the digging process to the unloading position. This can be done either in Cartesian coordinates, in joint coordinates, or in the coordinates of the actuators 130.

The final position for unloading can be varied here depending on external influences, such as the current material distribution on a lory.

In the third phase, the trajectory from the final unloading position to the next starting position is planned. This can be, for example, only the movements of individual actuators 130 (for example slowing gear, boom, arm, and bucket), a combination of these or a combination of the movement of the excavator with the movement of the other actuators 130.

In the following, a method for calculating or estimating the current digging force will be described.

To estimate the digging force, a model-based torque is required to obtain the necessary information relating to the digging force from the difference between the measured torques and the model-based torques. The calculation of the unloaded torque can be in any form. In this exemplary embodiment, a rigid-body system is assumed, for which purpose the calculation of the torques/forces $\tau_m$ applied at the joints can be performed, for example, in regressor form on the basis of the relation $$\tau_m = H_b(q,\dot{q},\ddot{q})\beta \qquad (1).$$

The vector $\beta$ contains parameters such as the mass, the centre of gravity and the moments of inertia of the components (=component information), wherein these can occur in linear combinations. The matrix H describes the influence of the parameter vector $\beta$ on the joints of the excavator as a function of the current positions q, speeds $\dot{q}$ and accelerations $\ddot{q}$ of the degrees of freedom or components. These can be measured, for example, with angle sensors and IMUs located on the components of the excavator boom.

To estimate the current digging force, a model with high quality should be available, i.e. in the unloaded case approximately $$\tau_{m,mess} \approx \tau_m \qquad (2)$$

with the measured torque $\tau_{m,mess}$ should apply. The high quality of the model is necessary in order to be able to calculate the information relating to the one or more external forces and thus the digging force $F_{grab}$ via $$\tau_{grab} = \tau_{m,mess} - \tau_m \qquad (3),$$

The differential moment $\tau_{grab}$ makes it possible to reconstruct the force vector or the digging force vector actually applied, with assumption of an application point.

The torque at a rotary joint due to the digging force is the cross product of the position vector with the applied force. Thus, only the portion of the digging force vector orthogonal to the position vector has an influence on the torque $\tau_{grab}$. Therefore, at least two torque measurements are needed to estimate the force vector in the plane of which the position vectors do not run parallel to each other (orthogonal position vectors would be ideal).

The relationship between the applied force at the end effector $F_{grab}$ and the corresponding torques at the joints $\tau_{grab}$ is $$\tau_{grab} = J^T(q)F_{grab}, \qquad (4)$$

with the geometric Jacobian matrix J(q). The latter is the Jacobian matrix of the forward kinematics $$p_{TCP} = f(q), \qquad (5)$$

i.e. the following applies $$J(q) = \frac{\partial f(q)}{\partial q}. \qquad (6)$$

In summary, equations (1), (3) and (4) give the following relationship $$J^T(q)F_{grab} = \tau_{m,mess} - H_b(q,\dot{q},\ddot{q})\beta, \qquad (7),$$

which can be used with recursive estimation methods, such as a recursive least squares algorithm, or with observers such as a Kalman filter to calculate the digging force $F_{grab}$. It should be explicitly noted that the application point is predefined by the function (5) at the end effector or TCP.

The digging force estimated by the method described above cart be used for several purposes, Firstly, it can be used to check whether the maximum force of the manipulator or movement device 110 is reached (this can be determined by a maximum force that can be taken up by one of the actuators 130). If this is the case, either an alert can be issued to the operator or, in automated operation, an adjustment of the planned trajectory for further execution of the digging process can be performed. On the other hand, the estimated applied force can be used for an assessment of the tilt resistance of the excavator. For a low risk of tilting, a sufficient counter-torque must be ensured due to a counterweight. This must be greater than the torque caused by the dynamics of the apparatus and the forces acting from outside.

The invention claimed is:

1. A method for monitoring and/or performing a movement of an item of machinery, wherein the item of machinery comprises the following:
   a movement device with a tool for picking up material, which comprises at least two components, each of which is movable via at least one actuator,
   a control system by means of which the actuators can be controlled by way of open-loop and/or closed-loop control, wherein the control system is configured to automatically actuate the actuator in such a way that the tool moves along a trajectory at a reference speed, and
   a torque transducer for measuring an applied torque,
   the method comprising the following steps:
   1) detecting status information concerning at least one current position and/or current speed and/or current acceleration of at least two components,
   2) calculating torques that are applied to components due to a current configuration of the item of machinery, under consideration of the detected status information and under consideration of a mass, a moment of inertia, a centre of gravity, dimensions, and/or a geometry of the components,
   3) detecting torques actually applied to components via the torque transducer,
   4) comparing the calculated and detected torques and determining a force vector actually applied at a defined application point of the item of machinery on the basis of said comparison, and
   5) comparing the determined force vector with at least one comparison force vector and executing an action on the basis of said comparison, wherein the action comprises a reduction of the reference speed to a lower reference speed above zero,
   wherein the status information is detected by means of sensors arranged on the movement device, wherein the item of machinery has one or more of the following sensors:
   at least one pressure sensor for measuring a hydraulic pressure applied to an actuator,
   at least one torque transducer,
   at least one angle sensor for measuring a current angle of a component, at least one position sensor for measuring a current position of a component, at least one inertial sensor for measuring a current speed and/or acceleration of a component, at least one sensor for detecting a current fill level and/or fill weight of the tool, and at least one acoustic sensor for detecting a noise of the item of machinery during operation.

2. The method according to claim 1, wherein the torques applied to the components due to the current configuration of the item of machinery are calculated under consideration of a mass, a moment of inertia and a centre of gravity of the components.

3. The method according to claim 1, wherein the defined application point is located at the tool.

4. The method according to claim 1, wherein the calculated and the detected torques are each related to the same joints or rotary joints of the movement device.

5. The method according to claim 4, wherein the reference points, starting from a joint of a component on a superstructure of the item of machinery, define position vectors which are not parallel to each other when the torques are detected.

6. The method according to claim 1, wherein the force vector is determined by means of a recursive method and/or is multiplied by a weighting factor.

7. The method according to claim 1, wherein the action further comprises a visual and/or acoustic issuance of a warning.

8. The method according to claim 1, further comprising after reducing the reference speed to the lower reference speed, re-determining the force vector, comparing the re-determined force vector with the at least one comparison force vector, and executing a second action on the basis of said comparison.

9. The method according to claim 8, wherein the second action comprises a second reduction of the lower reference speed to a second lower reference speed above zero.

10. The method according to claim 9, wherein at least one force vector calculated on the basis of a maximum possible pressure at an actuator is projected onto a reference vector in order to obtain the comparison force vector.

11. The method according to claim 10, wherein the action is executed when the absolute value of the determined force vector exceeds the absolute value of the comparison force vector and a trajectory error exceeds a limit value.

12. The method according to claim 10, wherein the second action is executed when the absolute value of the re-determined force vector exceeds the absolute value of the comparison force vector and a trajectory error exceeds a limit value for a time threshold.

13. The method according to claim 8, wherein the second action comprises a termination of the automatic movement along the trajectory.

14. The method according to claim 1, wherein a parameter representing the tilting behaviour of the item of machinery is concluded on the basis of the determined force vector and a current position of the item of machinery.

15. The method according to claim 1, wherein the movement device is an excavator boom, wherein a first component is a boom articulated to a superstructure of the item of machinery and a second component is an arm articulated to the first component.

16. An item of machinery comprising a movement device with a tool for picking up material, which comprises at least two components each movable via at least one actuator, a control system by means of which the actuators can be controlled by way of open-loop and/or closed-loop control, and a torque transducer for measuring an applied torque, wherein the item of machinery is configured to perform a method comprising:

1) detecting status information concerning at least one current position and/or current speed and/or current acceleration of at least two components, 2) calculating torques that are applied to components due to a current configuration of the item of machinery, under consideration of the detected status information and under consideration of a mass, a moment of inertia, a centre of gravity, dimensions, and/or a geometry of the components, 3) detecting torques actually applied to components via the torque transducer, 4) comparing the calculated and detected torques and determining a force vector actually applied at a defined application point of the item of machinery on the basis of said comparison, and 5) executing an action depending on the calculated force vector, wherein the action is executed when the absolute value of the determined force vector exceeds the absolute value of at least one comparison force vector and a trajectory error exceeds a limit value, wherein the action comprises a reduction of the reference speed to a lower reference speed above zero.

17. The item of machinery according to claim 16, further comprising a superstructure rotatably mounted on a mobile undercarriage, wherein the movement device is an excavator boom, wherein a first component is a boom articulated to the superstructure and a second component is an arm articulated to the first component.

18. The method according to claim 1, wherein the mass, the moment of inertia, the centre of gravity, the dimensions, and/or the geometry is stored on a memory of the item of machinery or on an external computer unit connected communicatively to the control system and/or is modeled by the control system on the basis of a static or dynamic model of the item of machinery.

19. The method according to claim 3, wherein the defined application point is fixable at an end effector of the movement device.

* * * * *